United States Patent [19]

Nagase

[11] Patent Number: 5,293,289
[45] Date of Patent: Mar. 8, 1994

[54] HEAD CARRIAGE DEVICE

[75] Inventor: Fumio Nagase, Tama, Japan

[73] Assignee: Teac Corporation, Tokyo, Japan

[21] Appl. No.: 21,656

[22] Filed: Feb. 22, 1993

Related U.S. Application Data

[63] Continuation of Ser. No. 742,642, Aug. 7, 1991, abandoned.

Foreign Application Priority Data

Aug. 10, 1990 [JP] Japan .................. 2-213523

[51] Int. Cl.⁵ .............................................. G11B 5/48
[52] U.S. Cl. .................................. 360/104; 360/99.01
[58] Field of Search .......................... 360/104, 99.01

[56] References Cited

U.S. PATENT DOCUMENTS

| | | | |
|---|---|---|---|
| 4,719,692 | 1/1988 | Sakai | 360/104 X |
| 4,740,854 | 4/1988 | Shibuya et al. | |
| 4,764,830 | 8/1988 | Kobayashi | 360/104 |
| 5,051,854 | 9/1991 | Iwanaga | 360/104 X |
| 5,055,955 | 10/1991 | Mitsuhashi | 360/104 |

Primary Examiner—A. J. Heinz
Attorney, Agent, or Firm—Michael N. Meller

[57] ABSTRACT

A head carriage device for use in a disk recording/reproducing unit of the type in which a head mounted on a head carriage is positionable to read or write data on a recording medium accommodated in a disk case which is placed into the unit at a recording/reproducing position thereof. The head carriage device includes an arm on which a first head is mounted, the first head being positionable on top of the recording medium, a head carriage on which a second head is mounted such that the second head is positionable on bottom of the recording medium, the first and second heads being opposed to each other and being formed such that a height of the first head above the recording medium is different from a height of the second head below the recording medium, thereby reducing a height of the disk recording/reproducing unit in which the head carriage device is installed.

5 Claims, 4 Drawing Sheets

HEAD CARRIAGE DEVICE

This application is a continuation of application Ser. No. 752642, filed Aug. 7, 1991 and now abandoned.

BACKGROUND OF THE INVENTION

The present invention generally relates to a head carriage device, and more particularly to a head carriage device for use in a disk recording/reproducing unit, which provides greater flexibility to the design of a thin-type, small-sized disk recording/reproducing unit.

In a disk recording/reproducing unit which uses a flexible disk as a recording medium, a magnetic head mounted on a head carriage device is arranged such that the magnetic head is slidably movable in a radial direction of the flexible disk and positionable to read or write data on the flexible disk. An example of a dual side recording type head carriage device is shown in FIGS. 8 and 9. This head carriage device 10 is mounted within a disk recording/reproducing unit which uses as the recording medium a 3.5-inch flexible disk accommodated in a disk case with head access windows formed therein. The head carriage device 10 generally has a carriage member 11 and an arm 12 and can be moved relative to the disk recording/reproducing unit by means of a drive means (not shown) in a direction as indicated by an arrow $A_1$–$A_2$ in FIG. 8. The head drive part may be, for example, a steel belt connected to a drive motor provided in the disk drive unit.

The arm 12 is connected to the carriage member 11 by a flexible member 12a, this flexible member 12a resiliently biasing the arm 12 so that the arm is movable or rotatable in a direction as indicated by an arrow $B_1$–$B_2$ in FIG. 8. An upper magnetic head 13 is mounted on bottom of the arm 12 and a lower magnetic head 14 is mounted on top of the carriage member 11. These magnetic heads 13, 14 are arranged at end portions of the arm 12 and the carriage member 11 in the direction $A_1$ such that the two heads 13, 14 are opposed to each other when a disk case 15 in which a flexible disk 16 is accommodated is inserted into the disk recording/reproducing unit. The disk case 15 has disk access windows 15a formed in top and bottom surfaces of the disk case 15, respectively. The magnetic heads 13, 14 during operation are placed onto the flexible disk 16 through the disk access windows 15a so that the magnetic heads 13, 14 slidably contact the top and bottom surfaces of the flexible disk 16 to read or write data.

Conventionally, the magnetic heads 13, 14 which are opposed to each other in the head carriage device 10 are formed with the same size and shape, and a height of the magnetic head 13 from a top surface of the flexible disk 16 to the arm 12, as indicated by a letter H in FIG. 8, which is also called a slider height, is substantially equal to a height of the magnetic head 14 from the carrier member 11 to a bottom surface of the disk 16, as indicated by a letter H in FIG. 8. In recent years, there is the demand for small-sized personal computers in which a disk recording/reproducing unit is installed, and a thin-type, small-sized disk recording/reproducing unit is desired by manufacturers for the use in personal computers.

In the conventional head carriage device 10, the magnetic heads 13, 14 are formed with the same height, and therefore a predetermined height of each of the magnetic heads 13, 14 is required for making the magnetic heads positionable to read or write data on the flexible disk 16 accommodated in the disk case 15. For example, the disk case 15 for use in the conventional head carriage device 10 is 3.3+/−0.2 mm thick, and therefore the minimum heights of the magnetic heads 13, 14 in total must be greater than 3.5 mm. Moreover, a clearance in vertical direction between the carriage member 11 and the disk case 15 and a clearance in vertical direction between the arm 12 and the disk case 15 are needed, and therefore the actual height of each of the magnetic heads 13, 14 used for the head carriage device is usually between 2.5 mm and 2.7 mm.

On the other hand, in the head carriage device, the arm 12 is arranged such that it is movable or rotatable relative to the carriage member 11 in a direction as indicated by an arrow $B_1$ in FIG. 8 by means of a suitable moving mechanism (not shown). When the disk case 15 is inserted into or demounted from the disk recording/reproducing unit, the arm 12 must be moved upwardly for preventing the magnetic heads 13, 14 from interfering with the disk case 15. In a case where the magnetic heads 13, 14 have a predetermined height, it is necessary to move the arm 12 upwardly from the carriage member 11 so that the magnetic heads 13, 14 are safely released from the positions thereof where the magnetic heads 13, 14 slidably contact the flexible disk 16 through the disk access windows 15a of the disk case 15. Accordingly, there is a problem in that the disk recording/reproducing unit in which the above mentioned head carriage device requiring such an arm movement space at an upper location is provided has an unnecessarily great height and becomes bulky, the arm movement space allowing the arm 12 to move upwardly as described above.

Moreover, because the magnetic heads 13, 14 in the conventional head carriage device have the same height from the flexible disk 16, the location of the head carriage device 10 to be arranged in the disk recording/reproducing unit is restricted. A feasible design of the disk recording/reproducing unit which is located in the vicinity of the head carriage device is limited, and there is no flexibility in selecting the design owing to the specified height of the magnetic heads.

SUMMARY OF THE INVENTION

Accordingly, it is a general object of the present invention to provide an improved head carriage device in which the above described problems of the conventional device are eliminated.

Another and more specific object of the present invention is to provide a head carriage device which comprises an arm on which a first magnetic head is mounted, the arm being swingably supported and the first magnetic head is positionable on top of a recording medium, which is accommodated in a disk case, a head carriage on which a second magnetic head is mounted such that the second magnetic head is positionable on bottom of the recording medium, the second magnetic head being opposed to the first magnetic head, the first magnetic head and the second magnetic head being formed such that a height of the first magnetic head above the recording medium is different from a height of the second magnetic head below the recording medium, thereby reducing a height of a disk recording/reproducing unit in which the head carriage device is installed. According to the present invention, it is possible to provide greater flexibility to the design of a disk recording/reproducing unit because a free space is created for modifying other parts of the disk recording/reproducing unit in the vicinity of the head carriage device according to the present invention. Also, it is possible to achieve a thin-type, small-sized design of a disk recording/reproducing unit by applying the head carriage device of the present invention to the disk recording/reproducing unit, because a height of the head carriage device when the arm is lifted upwardly is reduced.

Other objects and further features of the present invention will become more apparent from the following detailed description when read in conjunction with the accompanying drawings.

DESCRIPTION OF THE PREFERRED EMBODIMENTS

Figure 1:
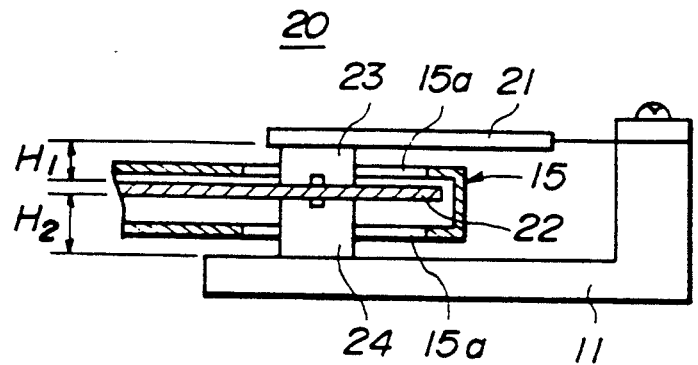
FIG. 1 is a side view showing essential parts of a first embodiment of a head carriage device according to the present invention.
Figure 8:
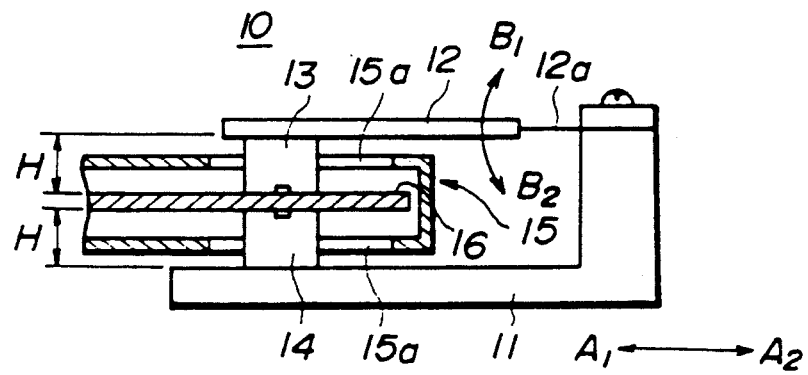
FIGS. 8 and 9 are a side view and a plan view showing essential parts of a conventional head carriage device.
Figure 9:
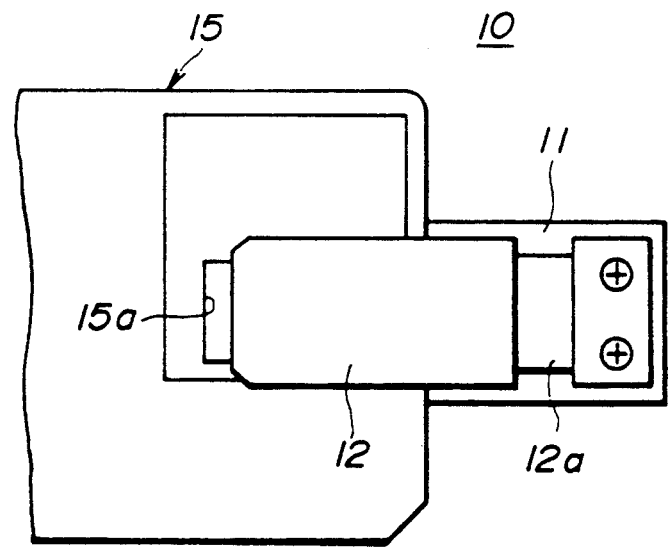

A description will be given of a first embodiment of a head carriage device according to the present invention, with reference to FIG. 1. This head carriage device 20 in FIG. 1 is mounted in a disk drive unit (not shown) and arranged such that the head carriage device 20 is movable within the disk drive unit. A magnetic head of the head carriage device is positionable to read or write data on a flexible disk (or recording medium) so that the disk drive unit reads or writes data on the flexible disk for reproducing or recording information. In FIG. 1, those parts which are the same as those corresponding parts of the device shown in FIGS. 8 and 9 are designated by the same reference numerals, and a description thereof will be omitted.

In the first embodiment, the head carriage device 20 is constructed such that a magnetic head 23 has a relatively small height $H_1$, and this height $H_1$ of the magnetic head 23 provided on an arm 21 is smaller than a height $H_2$ of a magnetic head 24 provided on the carriage member 11 ($H_1 > H_2$). It is possible to achieve a thinner design of the disk recording/reproducing unit by applying the head carriage device of the present invention thereto. The first embodiment of the head carriage device 20 according to the present invention will be described below in more detail.

As being well known, the disk case 15 in which a flexible disk 22 is accommodated is inserted into the disk drive unit before recording/reproducing operation is started, and, after the operation is completed, the disk case 15 is demounted from the disk drive unit. The disk drive unit in which the disk case 15 is mounted performs information recording/reproducing processes. The arm 21 is constructed with a lifting mechanism (not shown) such that the arm 21 is lifted upwardly by the lifting mechanism when the disk case 15 is inserted into or demounted from the disk drive unit, thus preventing the disk case 15 from interfering with the magnetic heads 23, 24. This upward movement of the arm 21 is also called the arm lift. The disk drive unit requires an arm movement space which is located above the head carriage device provided within the disk drive unit and allows the arm 21 to be safely lifted upward. Accordingly, a smaller amount of upward movement of the arm 21 when it is lifted upwardly would reduce this arm movement space within the disk recording/reproducing unit above the arm 21 of the head carriage device of the invention, from an arm movement space required by the conventional device for lifting the arm 21 upwardly with no interference. It is possible to achieve a thinner design of a disk recording/reproducing unit to which the head carriage device 20 is applied, because the present invention enables a smaller amount of upward movement of the arm 21.

Figure 2:
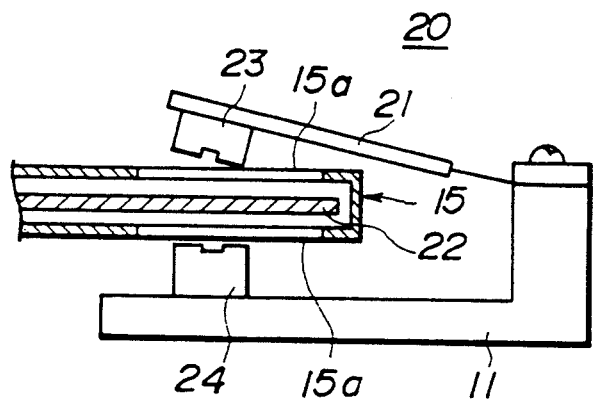
FIG. 2 is a side view showing the head carriage device shown in FIG. 1 in which an arm is lifted upwardly.

FIG. 2 shows the head carriage device 20 in which the arm 21 is lifted upwardly from the disk case 15. In the first embodiment of the head carriage device 20, the magnetic head 23 provided on the arm 21 is formed with a smaller height $H_1$, when compared with the height H in the conventional device, and it is possible to reduce the amount of the arm lift of the arm 21 required to avoid interference of the magnetic heads 23, 24 with the disk case 15 when the disk case 15 is inserted into or demounted from the disk recording/reproducing unit. Thus, the space within the disk recording/reproducing unit above the head carriage device 20 required for the upward movement of the arm 21 is decreased, which enables a thinner design of a disk recording/reproducing unit by installing the head carriage device 20 shown in FIG. 2 in the disk recording/reproducing unit. Also, in a case where a disk recording/reproducing unit having the same height as that of the conventional device is provided, a margin of the internal space can be produced for re-arranging other parts of the disk recording/reproducing unit, and therefore it is possible to provide greater flexibility to the component parts of the disk recording/reproducing unit which are located in the vicinity of the head carriage device 20.

Figure 3:
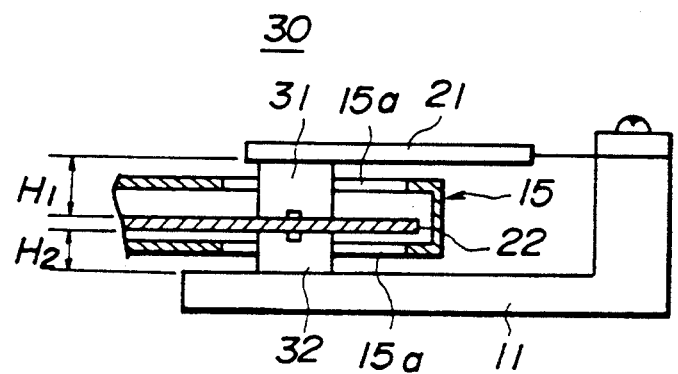
FIG. 3 is a side view showing essential parts of a second embodiment of a head carriage device according to the present invention.

FIG. 3 shows a second embodiment of the head carriage device according to the present invention. In FIG. 3, those parts which are the same as those corresponding parts of the device 20 shown in FIG. 1 are designated by the same reference numerals and a description thereof will be omitted. A head carriage device 30 in FIG. 3 includes a magnetic head 31 mounted on the arm 21 and a magnetic head 32 mounted on the carriage member 11. These magnetic heads 31, 32 are formed such that a height $H_1$ of the magnetic head 3 is greater than a height $H_2$ of the magnetic head 32 ($H_1 > H_2$) The magnetic head 32 in the second embodiment of the present invention is formed so as to have a height $H_2$ that is smaller than the height H of the conventional head carriage device, and therefore it is possible to provide greater flexibility to the design of a disk recording/reproducing unit, especially in a portion thereof below the flexible disk 22 in the disk case 15. A more detail description of this second embodiment is given in the following.

Figure 4:
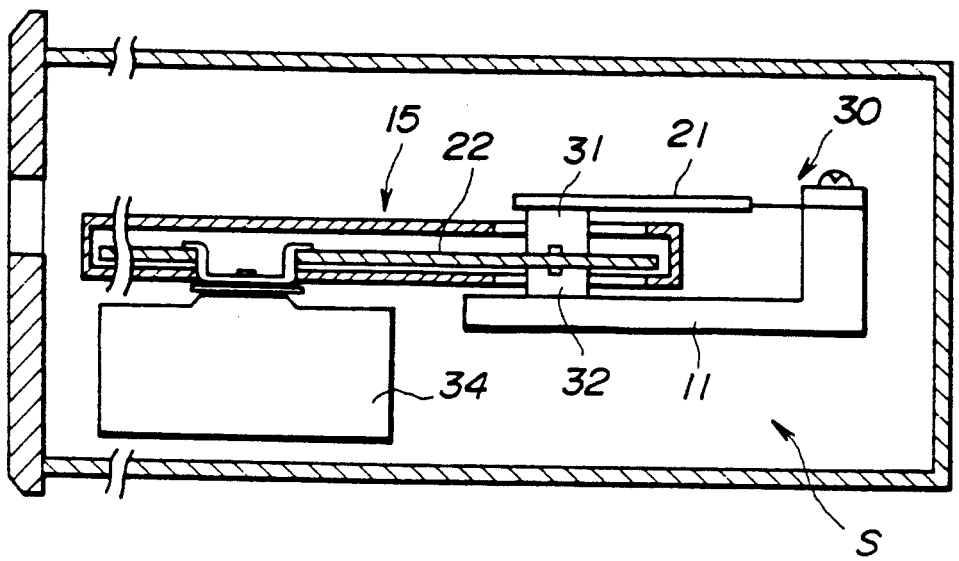
FIG. 4 is a side view showing a disk drive unit in which the head carriage device shown in FIG. 3 is installed.

FIG. 4 shows a disk recording/reproducing unit 33 in which the head carriage device 30 as shown in FIG. 3 is installed. As described above, the magnetic heads 31, 32 are formed such that a height $H_1$ of the magnetic head 31 is greater than a height $H_2$ of the magnetic head 32. Thus, the head carriage device 30 is located at a higher position within the disk recording/reproducing unit 33, when compared with the position of the conventional head carriage device 10 in which the magnetic heads 13, 14 have the same height H. The arrangement position of the head carriage device 30 within the disk recording-/reproducing unit 33 is higher than the position of the conventional device 10 by a height difference $(H-H_2)$. Therefore, a relatively great free space can be created within the disk recording/reproducing unit, which is located below the flexible disk 22 as indicated by an arrow S in FIG. 4. Thus, in the second embodiment of the invention, it is possible to provide greater flexibility to the design of the disk recording/reproducing unit at a location below the flexible disk 22, and relative positions or arrangement of other component parts of the disk recording/reproducing unit can be easily modified by using this free space indicated by the arrow S in FIG. 4. For example, a spindle motor 34 with greater thickness as shown in FIG. 4 can be arranged in the disk recording/reproducing unit 33 for obtaining a greater motor torque. On the other hand, if the free space S below the flexible disk 22 in the disk case 15 is partially eliminated from the disk recording/reproducing unit 33, it is possible to create a thinner design of a disk recording/reproducing unit than that of the conventional disk unit.

Also, the disk recording/reproducing unit usually requires a mechanism for lifting the disk case 15 such that the disk case 15 does not interfere with a spindle shaft of the spindle motor 34 when the disk case 15 is inserted into or demounted from the disk recording/reproducing unit 33. In the second embodiment, it is possible to make the amount of lifting the disk case 15 as mentioned above smaller than that of the conventional device, owing to the head carriage device 30 in which the magnetic head 32 mounted on the carriage member 11 has a relatively small height $H_2$. Therefore, in the second embodiment of the invention, it is possible to provide greater flexibility to the design of the lifting mechanism for lifting the disk case 15 when the disk case 15 is inserted into or demounted from the disk recording/reproducing unit.

Figure 5:
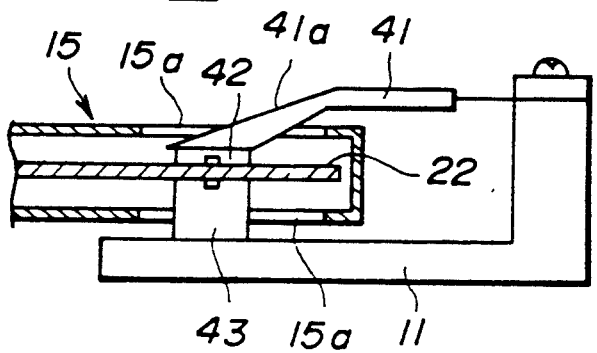
FIG. 5 is a side view showing essential parts of a third embodiment of a head carriage device according to the present invention.
Figure 6:
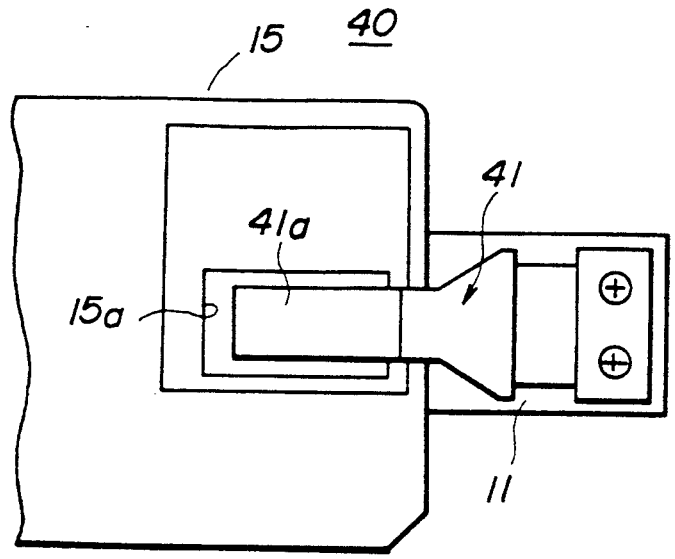
FIG. 6 is a plan view showing essential parts of the head carriage device shown in FIG. 5.

FIG. 5 shows a third embodiment of the head carriage device according to the present invention. In FIG. 5, those parts which are the same as those corresponding parts of the device 30 in FIG. 3 are designated by the same reference numerals, and a description thereof will be omitted. This head carriage device 40 in FIG. 5 includes an arm 41 on which a magnetic head 42 is mounted, and includes the carriage member 11 on which a magnetic head 43 is mounted. The arm 41 is formed with an end tapered portion 41a such that the end portion of the arm 41 passes through the disk access window 15a of the disk case 15 and the magnetic head 42 on the arm 41 slidably contacts the flexible disk 22. As being more clearly shown in FIG. 6, the arm 41 is formed so as to have an end tapered portion 41a that is narrower than the other portion of the arm 41 and has a smaller width than a width of the disk access window 15a of the disk case 15. Thus, the end tapered portion 41a of the arm 41 on which the magnetic head 42 is mounted can be inserted into the disk case 15 through the disk access window 15a so that the magnetic head 42 slidably contacts a surface of the flexible disk 22 accommodated in the disk case 15.

When the arm 41 in third embodiment of the present invention is inserted into the disk case 15 through the disk access window 15a, the magnetic head 42 mounted on bottom of the arm 41 is placed so as to slidably contact the flexible disk 22 in the disk case 15. By adjusting the length of an inserted portion of the arm 41 within the disk case 15, it is possible to easily modify a height of the magnetic head 42. Therefore, in the third embodiment, the height of the magnetic head 42 can be suitably reduced to a smaller one, similar to that in the first embodiment as shown in FIG. 1. Also, the magnetic head 43 mounted on the carriage member 11 is the same as the magnetic head 24 shown in FIG. 1, so the height of the magnetic head 43 is substantially equal to the height $H_2$ as shown in FIG. 1. Similar to the first embodiment described above, the head carriage device 40 in the third embodiment enables a thinner design of a disk recording/reproducing unit.

Figure 7:
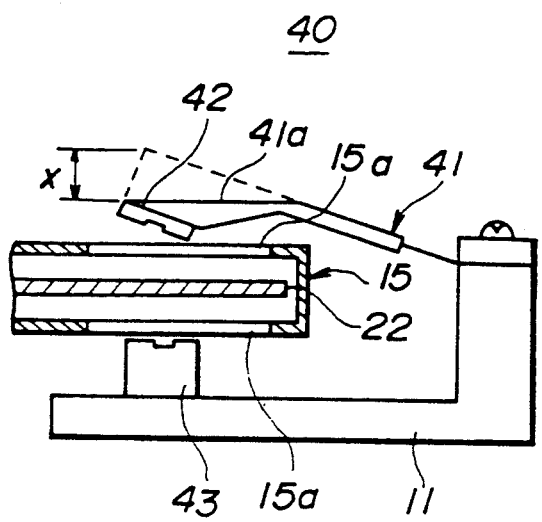
FIG. 7 is a side view showing the head carriage device shown in FIG. 5 in which an arm is lifted upwardly.

FIG. 7 shows the head carriage device 40 in the third embodiment in which the arm 41 is lifted upwardly. When the arm 41 is lifted upwardly as shown in FIG. 7, the end tapered portion 41a of the arm 41 is substantially in alignment with horizontal direction, and therefore a height of the head carriage device 40 when the arm 41 is lifted upwardly can be reduced. This height of the head carriage device 40 in the third embodiment is smaller than a height of the conventional head carriage device 10 by a height difference as indicated by an arrow X in FIG. 7. The height of the conventional disk carriage device in which the arm has no end tapered portion is indicated by a dotted line in FIG. 7.

In the present invention, the location of the flexible disk 22 in the disk case 15 is varied slightly in vertical direction, when compared with the location of the disk 16 in the conventional head carriage device 10. However, this does not give significant influence on the rotating movement and operation of the flexible disk 22 for recording and reproducing information.

According to the present invention, it is possible to provide greater flexibility to the design of a disk recording/reproducing unit because a free space is created for modifying other parts of the disk recording/reproducing unit in the vicinity of the head carriage device according to the present invention. Also, it is possible to achieve a thin-type, small-sized design of a disk recording/reproducing unit by applying the head carriage device of the present invention to the disk recording/reproducing unit, because a height of the head carriage device when the arm is lifted upwardly is reduced.

Further, the present invention is not limited to the above described embodiments, and variations and modifications may be made without departing from the scope of the present invention.

What is claimed is:

1. A disk recording/reproducing unit in which a head mounted on a head carriage is positionable to read or write data on a recording medium having a top surface and a bottom surface accommodated in a disk case adapted to be placed into said disk recording/reproducing unit at a recording/reproducing position thereof, said head carriage comprising:

an arm on which a first magnetic head having a bottom surface is mounted, said arm being movably supported so that said bottom surface of said first magnetic head is postionable on said top surface of said recording medium;

a carriage member having a mounting surface separated a fixed distance from said arm; and a second magnetic head mounted on the mounting surface of said carriage member, said second magnetic head having a top surface positionable on said bottom surface with said second magnetic head disposed opposite to said first magnetic head, wherein said arm is displaced a first distance from the bottom surface of said first magnetic head and said carriage member is displaced a second distance from the top surface of said second magnetic head with said first and second distance being unequal and with said recording medium positioned non-symmetrically between said arm and said carriage member by a distance corresponding to difference between said first and second distances thereby reducing the thickness of the disk recording/reproducing unit for accommodating said head carriage.

2. The device as claimed in claim 1, whrein said first magnetic head is smaller in height than said second magnetic head.

3. The device as claimed in claim 1, wherein said second magnetic head is smaller in height than said first magnetic head.

4. The device as claimed in claim 1, wherein said arm is swingably supported on said head carriage by a leaf spring, said leaf spring resiliently biasing the arm so that said first magnetic head mounted on said arm is swingable with respect to said head carriage in vertical direction.

5. The device as claimed in claim 1, wherein said recording medium accommodated in said disk case is a flexible disk.

* * * * *